(12) United States Patent
Fukunaga et al.

(10) Patent No.: US 11,339,299 B2
(45) Date of Patent: May 24, 2022

(54) METHOD OF MAKING OIL REPELLENT SHEET MATERIAL AND GAS SENSOR

(71) Applicants: SUMITOMO ELECTRIC INDUSTRIES, LTD., Osaka (JP); SUMITOMO ELECTRIC FINE POLYMER, INC., Osaka (JP)

(72) Inventors: Atsushi Fukunaga, Osaka (JP); Fumihiro Hayashi, Osaka (JP)

(73) Assignees: SUMITOMO ELETRIC INDUSTRIES, LTD., Osaka (JP); SUMITOMO ELECTRIC FINE POLYMER, INC., Osaka (JP)

(*) Notice: Subject to any disclaimer, the term of this patent is extended or adjusted under 35 U.S.C. 154(b) by 0 days.

(21) Appl. No.: 16/954,594

(22) PCT Filed: Oct. 25, 2018

(86) PCT No.: PCT/JP2018/039579
§ 371 (c)(1),
(2) Date: Jun. 17, 2020

(87) PCT Pub. No.: WO2019/138642
PCT Pub. Date: Jul. 18, 2019

(65) Prior Publication Data
US 2020/0309731 A1    Oct. 1, 2020

(30) Foreign Application Priority Data
Jan. 11, 2018  (JP) ............................. JP2018-002896

(51) Int. Cl.
*C08J 9/36*  (2006.01)
*C09D 5/16*  (2006.01)
(Continued)

(52) U.S. Cl.
CPC .............. *C09D 5/1668* (2013.01); *C08J 7/04* (2013.01); *C08J 9/365* (2013.01); *C09D 5/00* (2013.01);
(Continued)

(58) Field of Classification Search
CPC ...................................................... B29C 43/02
See application file for complete search history.

(56) References Cited

U.S. PATENT DOCUMENTS

| 5,800,689 | A |   | 9/1998 | Hori et al. | |
|---|---|---|---|---|---|
| 6,080,472 | A | * | 6/2000 | Huang | ........................ C08J 5/18 |
|  |  |  |  |  | 428/315.5 |

(Continued)

FOREIGN PATENT DOCUMENTS

| JP | 5-320255 | * 12/1993 |
|---|---|---|
| JP | H08-240559 | 9/1996 |

(Continued)

OTHER PUBLICATIONS

Machine translation of document.*

*Primary Examiner* — Austin Murata
(74) *Attorney, Agent, or Firm* — IPUSA, PLLC (57) ABSTRACT

A method of making an oil repellent sheet material according to an embodiment of the present disclosures includes a step of applying to a porous sheet a composition for forming an oil repellent layer, the composition containing a solvent and an amorphous fluorine resin dispersed therein, and a step of swaging the porous sheet after the step of applying, wherein the porous sheet has a fibrous skeleton composed mainly of polytetrafluoroethylene, the method of making an oil repellent sheet material further comprising a heat treatment step of heating the porous sheet to which the composition for forming an oil repellent layer is applied, before or after the step of swaging.

8 Claims, 2 Drawing Sheets

(51) Int. Cl.
    *C09D 5/00*           (2006.01)
    *C09D 127/12*       (2006.01)
    *C09D 127/18*       (2006.01)
    *G01N 27/407*       (2006.01)
    *G01N 27/409*       (2006.01)
    *C08J 7/04*           (2020.01)

(52) U.S. Cl.
    CPC ......... *C09D 127/12* (2013.01); *C09D 127/18* (2013.01); *G01N 27/409* (2013.01); *G01N 27/4072* (2013.01); *C08J 2327/18* (2013.01); *C08J 2427/12* (2013.01); *C08J 2427/18* (2013.01)

(56) References Cited

U.S. PATENT DOCUMENTS

| | | |
|---|---|---|
| 7,484,401 B2 | 2/2009 | Yamauchi |
| 2015/0259558 A1 | 9/2015 | Mugisawa et al. |

FOREIGN PATENT DOCUMENTS

| | | |
|---|---|---|
| JP | 2005-535877 | 11/2005 |
| JP | 2007-147586 | 6/2007 |
| JP | 2009-180550 | 8/2009 |
| JP | 2012-164735 | 8/2012 |
| JP | 2014-070100 | 4/2014 |
| WO | 2004/015409 | 2/2004 |

\* cited by examiner

METHOD OF MAKING OIL REPELLENT SHEET MATERIAL AND GAS SENSOR

TECHNICAL FIELD

The disclosures herein relate to a method of making an oil repellent sheet material and a gas sensor The present application is based on and claims priority to Japanese patent application No. 2018-2896 filed on Jan. 11, 2018, and the entire contents of the Japanese patent application are hereby incorporated by reference.

BACKGROUND ART

Gas sensors are used to detect the oxygen concentration or the like in the exhaust gas of automobiles. A gas sensor has a gas inlet for admitting an external gas. The gas inlet is provided with a porous filter having a gas permeability. The porous filter is secured by a swaging process to a tubular body which is in communication with the gas inlet for admitting a gas to a sensor device. In addition to the gas permeability, the porous filter is required to have a high heat resistance for withstanding the exhaust gas of automobiles. In consideration of this, a porous sheet that contains mainly polytetrafluoroethylene is presently used as a porous filter (see Japanese Patent Application Publication No. 2007-147586).

RELATED-ART DOCUMENTS

Patent Document

Patent Document 1: Japanese Patent Application Publication No. 2007-147586

SUMMARY OF THE INVENTION

A method of making an oil repellent sheet material according to an embodiment of the present disclosures includes a step of applying to a porous sheet a composition for forming an oil repellent layer, the composition containing a solvent and an amorphous fluorine resin dispersed therein, and a step of swaging the porous sheet after the step of applying, wherein the porous sheet has a fibrous skeleton composed mainly of polytetrafluoroethylene, the method of making an oil repellent sheet material further comprising a heat treatment step of heating the porous sheet to which the composition for forming an oil repellent layer is applied, before or after the step of swaging.

Further, a gas sensor according to an embodiment of the present disclosures includes an oil repellent sheet material made by the method of making an oil repellent sheet material.

MODE FOR CARRYING OUT THE INVENTION

[Problem to be Solved by the Present Disclosures]

The conventional porous filter disclosed in the aforementioned publication has a high risk of reduction in gas permeability due to the clogging of pores, during continues use thereof, by adhered oil which is used for the maintenance and the like of automobiles.

The present disclosures are provided based on the circumstances described above, and is directed to providing a gas sensor and a method of making an oil repellent sheet material that may sustain a high gas permeability and an oil repellent property.

[Advantage of the Present Disclosures]

The method of making an oil repellent sheet material according to the present disclosures serves to produce an oil repellent sheet material that sustains a high gas permeability and an oil repellent property. Further, the gas sensor according to the present disclosures sustains a high gas permeability and an oil repellent property.

[Description of Embodiments of the Present Disclosures]

Embodiments of the present disclosures will be listed and described first.

A method of making an oil repellent sheet material according to an embodiment of the present disclosures includes a step (hereinafter referred to as an application step) of applying to a porous sheet a composition for forming an oil repellent layer, the composition containing a solvent and an amorphous fluorine resin dispersed therein, and a step (hereinafter referred to as a swaging step) of swaging the porous sheet after the application step, wherein the porous sheet has a fibrous skeleton composed mainly of polytetrafluoroethylene, the method of making an oil repellent sheet material further comprising a heat treatment step of heating the porous sheet to which the composition for forming an oil repellent layer is applied, before or after the swaging step.

The method of making an oil repellent sheet material applies a composition for forming an oil repellent layer, containing a solvent and an amorphous fluorine resin dispersed therein, to a porous sheet having a fibrous skeleton composed mainly of polytetrafluoroethylene, thereby providing an oil repellent sheet material with an excellent gas permeability and an excellent oil repellent property. The method of making an oil repellent sheet material has the heat treatment step of heating the porous sheet to which the composition for forming an oil repellent layer is applied, before or after the swaging step, thereby reducing the likelihood of lowering of a gas permeability and an oil repellent property occurring after the swaging. This enables the sustainment of a high gas permeability and a high oil repellent property.

In the method of making an oil repellent sheet material, the heat treatment step is preferably performed before the swaging step. Provision of the heat treatment step performed before the swaging step as noted above is more likely to reduce the lowering of an oil repellent property caused by the swaging.

In the case in which the heat treatment step is performed prior to the swaging step, the heating temperature in the heat treatment step is preferably greater than 250° C. and less than 340° C., and the length of heat treatment is preferably greater than or equal to 5 minutes. Use of both the heating temperature in the heat treatment step within the above-noted range and the length of heat treatment greater than or equal to the above-noted lower limit can readily and reliably reduce the lowering of an oil repellent property caused by swaging.

In the case in which the heat treatment step is performed prior to the swaging step, the heating temperature is more preferably greater than or equal to 300° C. and less than or equal to 335° C. Use of the heating temperature within the above-noted range can more readily and more reliably reduce the lowering of an oil repellent property caused by swaging.

In the application step, the composition for forming an oil repellent layer may be spray-coated. Spray-coating the composition for forming an oil repellent layer in the application step enables a selective increase in an oil repellent property at the position where an oil repellent property is needed, which serves to reduce manufacturing cost.

The amount of an applied amorphous fluorine resin is preferably 10 $\mu g/cm^2$ or more and 75 $\mu g/cm^2$ or less in terms of solids per unit area of the porous sheet. By ensuring that the amount of an applied amorphous fluorine resin falls within the above-noted range in terms of solids per unit area of the porous sheet, clogging of pores in the porous sheet caused by the application of an amorphous fluorine resin is reduced while sufficiently increasing an oil repellent property, thereby reliably reducing the lowering of a gas permeability.

The amorphous fluorine resin may be a tetrafluoroethylene-perfluorodioxol copolymer, a tetrafluoroethylene-perfluoromethylvinyl ether copolymer, a tetrafluoroethylene-perfluoroethylvinyl ether copolymer, a tetrafluoroethylene-perfluoropropyl vinyl ether copolymer, a perfluoro (4-vinyloxy-1-butene) cyclized polymer, or combinations thereof. With this arrangement, the oil repellent property of an obtained oil repellent sheet material is readily and reliably increased.

The oil repellent sheet material may be an air filter. Such a method of making an oil repellent sheet material serves to readily and reliably produce an air filter that sustains a high gas permeability and an oil repellent property.

Further, a gas sensor according to another embodiment of the present disclosures includes an oil repellent sheet material made by the method of making an oil repellent sheet material.

Having an oil repellent sheet material made by the method of making an oil repellent sheet material, such a gas sensor can maintain a high gas permeability and an oil repellent property.

In the present disclosures, the term "main component" refers to a component accounting for the highest content in terms of mass, and may refer to a component with a content of 50 mass % or more, for example. The term "unit area of a porous sheet" refers to a unit area of a porous sheet in plan view.

[Details of Embodiments of the Present Disclosures]

In the following, the method of making an oil repellent sheet material and a gas sensor according to an embodiment of the present disclosures will be described with reference to accompanying drawings.

[Method of Making Oil Repellent Sheet Material]

Figure 1:
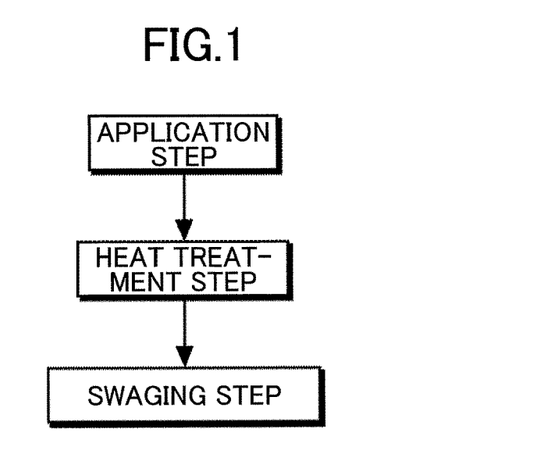
FIG. 1 is a flowchart illustrating a method of making an oil repellent sheet material according to an embodiment of the present disclosures.

The method of making an oil repellent sheet illustrated in FIG. 1 includes a step of applying to a porous sheet a composition for forming an oil repellent layer which contains a solvent and an amorphous fluorine resin dispersed therein, and a step of swaging the porous sheet after the application step. The method of making an oil repellent sheet material further includes a heat treatment step of heating the porous sheet to which the composition for forming an oil repellent layer is applied, before or after the swaging step. In the method of making an oil repellent sheet material, the porous sheet has a fibrous skeleton composed mainly of polytetrafluoroethylene (PTFE).

Since the method of making an oil repellent sheet material uses a porous sheet having a fibrous skeleton composed mainly of PTFE, the produced oil repellent sheet material has an excellent gas permeability and an excellent heat resistance. Specifically, the method of making an oil repellent sheet material can produce an oil repellent sheet material that has a high heat resistance for withstanding the exhaust gas of automobiles exceeding 300° C. Further, the method of making an oil repellent sheet material applies a composition for forming an oil repellent layer, containing a solvent and an amorphous fluorine resin dispersed therein, to a porous sheet having a fibrous skeleton composed mainly of PTFE, thereby providing an oil repellent sheet material with an excellent oil repellent property. The method of making an oil repellent sheet material has the heat treatment step of heating the porous sheet to which the composition for forming an oil repellent layer is applied, before or after the swaging step, thereby reducing the likelihood of lowering of a gas permeability, an oil repellent property, and a water pressure resistance occurring after the swaging. This enables the sustainment of a high gas permeability, a high oil repellent property, and a high water pressure resistance.

The method of making an oil repellent sheet material is suitable for the manufacturing of an air filter provided in a gas sensor or the like. Namely, the oil repellent sheet material obtained by the method of making an oil repellent sheet material is preferably an air filter. Use of the method of making an oil repellent sheet material allows an air filter capable of sustaining a high gas permeability, a high oil repellent property, and a high water pressure resistance to be readily and reliably produced.

(Application Step)

In the application step, a composition for forming an oil repellent layer which contains a solvent and an amorphous fluorine resin dispersed therein is applied to a porous sheet. The porous sheet and the amorphous fluorine resin used in the application step will first be described before describing the application step.

(Porous Sheet)

The porous sheet is a single layer structure composed mainly of PTFE, and has excellent heat resistance, chemical stability, weather resistance, incombustibility, strength, and the like. The porous sheet has a fibrous skeleton, and a plurality of pores are formed in the region surrounded by the fibrous skeleton. The fibrous skeleton has a network structure in which particle aggregates (i.e., secondary particles) referred to as nodes are linked via fibrous parts referred to as fibrils. In the porous sheet, gaps between fibrils or between fibrils and nodes form the above-noted pores. The porous sheet is not limited to a particular shape, and may be a flat film shape or a tubular shape, for example.

The lower limit of the PTFE content in the porous sheet is preferably 90%, more preferably 95%, and still more preferably 98%. Use of the PTFE content less than the lower limit creates a risk that the heat resistance of the obtained oil repellent sheet material is insufficient.

The PTFE may contain polymerization units derived from other copolymerizable monomers to the extent that the effect of the present disclosures is not impaired. The PTFE may contain polymerization units such as perfluoro (alkylvinyl ether), hexafluoropropylene (perfluoroalkyl) ethylene, chlorotrifluoroethylene, and the like, for example. The upper limit of the content of polymerization units derived from these other copolymerizable monomers is 3 mole percent of the total polymerization units constituting the PTFE, for example.

The porous sheet may contain other fluorine resins, other selectable ingredients and the like, to the extent that the effect of the present disclosures is not impaired. Examples of such other fluorine resins include tetrafluoroethylene-perfluoroalkylvinyl ether copolymer (PFA), tetrafluoroethylene-hexafluoropropylene copolymer (FEP), polyvinylidene fluoride (PVDF), tetrafluoroethylene-ethylene copolymer (ETFE), polychlorotrifluoroethylene (PCTFE), chlorotrifluoroethylene-ethylene copolymer (ECTFE), polyvinyl fluoride (PVF), fluoroolefin-vinyl ether copolymer, vinylidene fluoride-tetrafluoroethylene copolymer, vinylidene fluoride-hexafluoropropylene copolymer, and the like.

The porous sheet has a substantially uniform thickness. The lower limit of the average thickness of the porous sheet may be set depending on the application. In the case of the resulting oil repellent sheet material being an air filter for a gas sensor, the lower limit may be greater than or equal to 0.2 mm and less than or equal to 3.0 mm, for example.

(Composition for Forming Oil Repellent Layer)

Examples of the amorphous fluorine resins contained in the composition for forming an oil repellent layer include tetrafluoroethylene-perfluorodioxol copolymer (TFE/PDD), tetrafluoroethylene-perfluoromethylvinyl ether copolymer (TFE/MFA), tetrafluoroethylene-perfluoroethyl vinyl ether copolymer (TFE/EFA), tetrafluoroethylene-perfluoropropyl vinyl ether copolymer (TFE/PFA), perfluoro (4-vinyloxy-1-butene) cyclized polymer (BVE), and combinations of these. Use of these copolymers and/or polymers as the above-noted amorphous fluorine resin causes the oil repellent property of an oil repellent sheet material obtained by the method of making an oil repellent sheet material to be readily and reliably increased. Examples of the above-noted TFE/PDD include the AF series (manufactured by Mitsui-DuPont Fluorochemical Co., Ltd.), such as "AF1600" and "AF2400", the Algoflon series (manufactured by Solvay Specialty Polymers Japan K.K.), such as "Algoflon (registered trademark) AD", and the like, for example. Examples of the above-noted BVE include a "CYTOP (registered trademark)" manufactured by AGC Inc.

Examples of the solvent contained in the composition for forming an oil repellent layer include fluorine-based organic solvents such as heptacosafluorotributylamine, hexafluorobenzene, perfluorooctane, perfluoroheptane, perfluorotriethylamine, perfluorononane, perfluoropolyether, 2H,3H-decafluoropentane, 1H,1H,10H,10H-hexadecafluoro-1,10-decanediol, 1H,1H-nonafluoro-1-pentanol, 2,2,3,3,3-pentafluoro-1-propanol, 2,2,3,3,4,4,4-heptafluoro-1-butanol, and methyl heptafluorobutyrate, for example. The above-noted solvent preferably has the property of being incompatible with the above-noted amorphous fluorine resin. Use of the solvent having the property of being incompatible with the amorphous fluorine resin allows the stable dispersion of the amorphous fluorine resin.

The lower limit of the amorphous fluorine resin content with respect to the 100 parts by mass of the solvent is preferably 0.02 parts by mass and more preferably 0.06 parts by mass. The upper limit of this content is preferably 2.0 parts by mass and more preferably 0.5 parts by mass. Use of the content less than the lower limit creates a risk that the amorphous fluorine resin does not sufficiently cover the fibrous skeleton of the porous sheet. Use of the content greater than the upper limit creates a risk that the amount of a cover provided by the amorphous fluorine resin is needlessly large so as to cause the amorphous fluorine resin to clog the pores of the porous sheet.

The composition for forming an oil repellent layer may contain the amorphous fluorine resin and the solvent as well as other components to the extent that the desired effect of the present disclosures is not impaired.

(Application Method)

The method of applying the composition for forming an oil repellent layer in the application step includes a spray coating method, a spin coating method, a bar coating method, a die coating method, a slit coating method, a roll coating method, a dip coating method, and the like, for example. Among these, the spray boating method is a preferred application method. Namely, in the application step, the composition for forming an oil repellent layer may preferably be applied by spray coating. Use of a spray coating method as the application method allows a selective application to be readily performed with respect to the portions needing an oil repellent property, which selectively increases an oil repellent property of the portions in need, and also reduces the manufacturing cost.

The lower limit of the amount of an applied amorphous fluorine resin is preferably 10 $\mu g/cm^2$ and more preferably 20 $\mu g/cm^2$ in terms of solids per unit area of the porous sheet. Further, the upper limit of the applied amount is preferably 75 $\mu g/cm^2$ and more preferably 60 $\mu g/cm^2$. Use of the applied amount less than the lower limit creates a risk that the oil repellent property of the obtained oil repellent sheet material is not sufficiently increased. Use of the applied amount greater than the upper limit creates a risk that application of the amorphous fluorine resin causes the pores of the porous sheet to be clogged, resulting in an insufficient gas permeability of the obtained oil repellent sheet material. When the amorphous fluorine resin is applied only to a portion of the porous sheet, the term "the amount of an applied amorphous fluorine resin in terms of solids per unit area of the porous sheet" refers to the applied amount per unit area of the applied portion.

(Heat Treatment Step)

The method of making an oil repellent sheet material dries the solvent (in a drying step) after the application step, and then performs the heat treatment step after the drying step. The method of making an oil repellent sheet material uses the heat treatment step to form an oil repellent layer on the outer surface of the fibrous skeleton of the porous sheet.

In the heat treatment step, the amorphous fluorine resin applied in the application step is melted, so that the amorphous fluorine resin is caused to adhere to the outer surface of the fibrous skeleton of the porous sheet. In the heat treatment step, the amorphous fluorine resin and the fibrous skeleton of the porous sheet are mutually diffused at the interface therebetween so as to be securely bonded to each other. With this arrangement, the method of making an oil repellent sheet material reduces the lowering of an oil repellent property caused by the swaging step, which will be described later. Moreover, the method of making an oil repellent sheet material uses the heat treatment step to relax the residual stress of the porous sheet, thereby reducing the lowering of a gas permeability and a water pressure resistance resulting from use under high temperature environment after the swaging step.

The method of making an oil repellent sheet material is such that the heat treatment step is preferably performed before the swaging step. Provision of the heat treatment step performed before the swaging step as noted above is more likely to reduce the lowering of an oil repellent property caused by the swaging.

The lower limit of the heating temperature in the heat treatment step is preferably greater than 250° C., and is more preferably 280° C., and still more preferably 300° C. The upper limit of the heating temperature is preferably less than 340° C., and is more preferably 335° C. Use of the heating temperature less than the lower limit creates a risk that the amorphous fluorine resin and the fibrous skeleton of the porous sheet do not sufficiently undergo mutual diffusion. As a result, the strength of inter-element diffusion is not sufficiently increased, resulting in a risk that the oil repellent property is reduced due to compression or the like occurring in the swaging step. Conversely, use of the heating temperature greater than the upper limit creates a risk that thermal contraction causes the pores of the porous sheet to be clogged.

The lower limit of the length of heat treatment in the heat treatment step is preferably 5 minutes and more preferably 10 minutes. Use of the length of heat treatment shorter than the lower limit creates a risk that the amorphous fluorine resin and the fibrous skeleton of the porous sheet do not sufficiently undergo mutual diffusion. As a result, the strength of inter-element diffusion is not sufficiently increased, resulting in a risk that the oil repellent property is reduced due to compression or the like occurring in the swaging step. The length of heat treatment is not bounded by a particular upper limit, which may nonetheless be set to 20 minutes from the viewpoint of preventing the heat treatment from becoming needlessly long.

Examples of a heating method in the heat treatment step include hot air heating, for example.

(Swaging Step)

In the above-noted swaging step, one surface of the porous sheet having undergone the application step is supported by a support structure (not shown) or the like, and the other surface of the porous sheet is kept in contact with a metal board (not shown), followed by swaging the porous sheet by pressing the porous sheet with a die or the like from the board side. The porous sheet is retained in the position in which the portions thereof pressed by the board in the swaging step are depressed into the support structure side (i.e., in the plastically deformed position). The method of making an oil repellent sheet material uses the heat treatment step as described above to provide a sufficiently strong adhesion between the amorphous fluorine resin and the fibrous skeleton of the porous sheet. The method of making an oil repellent sheet material thus reduces the lowering of adhesion strength between the amorphous fluorine resin and the fibrous skeleton of the porous sheet caused by plastic deformation of the porous sheet occurring in the swaging step, thereby reducing the lowering of an oil repellent property.

The lower limit of a compression rate in the thickness direction of the porous sheet with respect to the swaging step is preferably 20% and more preferably 50%. Further, the upper limit of the compression rate is preferably 90% and more preferably 70%. Use of the compression rate less than the lower limit creates a risk of failing to reliably secure the porous sheet in a desired position. Conversely, use of the compression rate greater than the upper limit creates a risk that the porous sheet breaks at the point of compression.

[Gas Sensor]

In the following, a gas sensor 11 having an oil repellent sheet material 1 obtained by the method of manufacturing an oil repellent sheet material will be described with reference to FIG. 2 through FIG. 5 The gas sensor 11 is disposed in the exhaust path of an automobile engine, and is configured to measure the oxygen concentration contained in the exhaust gas of an automobile. The gas sensor 11 includes a sensor device 12 and a casing 13 for housing the sensor device 12. The gas sensor 11 further includes a gas inlet 14 for admitting an external gas at the proximal end of the sensor device 12. In the gas sensor 11, the oil repellent sheet material 1 is disposed in the gas inlet 14. Specifically, the gas inlet 14 includes a cylindrical cover 14a formed as part of the casing 13 and having a plurality of gas admitting holes 14b extending through the thickness thereof, a cylindrical oil repellent sheet material 1 disposed on the inner surface side of the cover 14a, and a tubular body 15a disposed on the inner surface side of the oil repellent sheet material 1 and having a plurality of gas admitting holes 15b extending through the thickness thereof. The opposite ends of the cover 14a in the axial direction each have an annular recess 14c that is inwardly depressed in the radial direction by the swaging process. As an example, the recesses 14c are formed by pressing the axially opposite ends of the cover 14a from the outside with a die while the porous sheet is disposed between the cover 14a and the tubular body 15a. The oil repellent sheet material 1 is retained in the position in which the portions thereof in contact with the recesses 14c are pressed toward the tubular body 15a.

Figure 3:
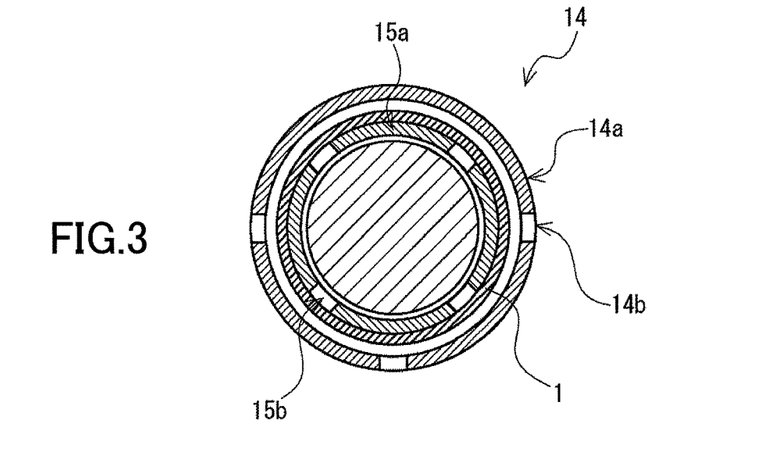
FIG. 3 is an enlarged cross-sectional view taken along the line A-A of a gas inlet of the gas sensor illustrated in FIG. 2.
Figure 4:
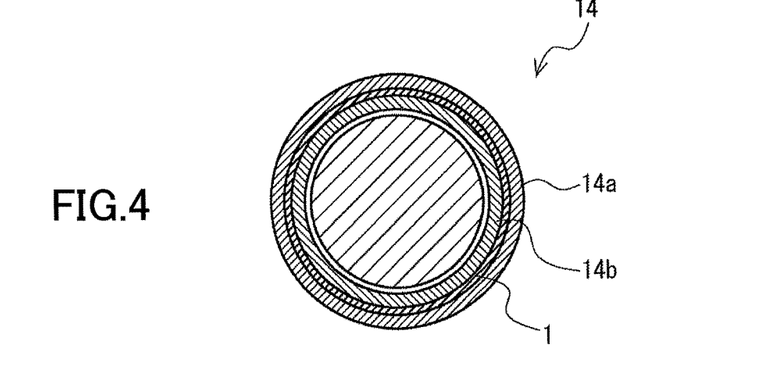
FIG. 4 is an enlarged cross-sectional view taken along the line B-B of the gas inlet of the gas sensor illustrated in FIG. 2.

As illustrated in FIG. 3, the gas admitting holes 14b formed through the cover 14a and the gas admitting holes 15b formed through the tubular body 15a are situated at circumferentially staggered positions. Specifically, the gas admitting holes 14b formed through the cover 14a and the gas admitting holes 15b formed through the tubular body 15a are displaced from each other by 45 degrees in the circumferential direction.

Figure 2:
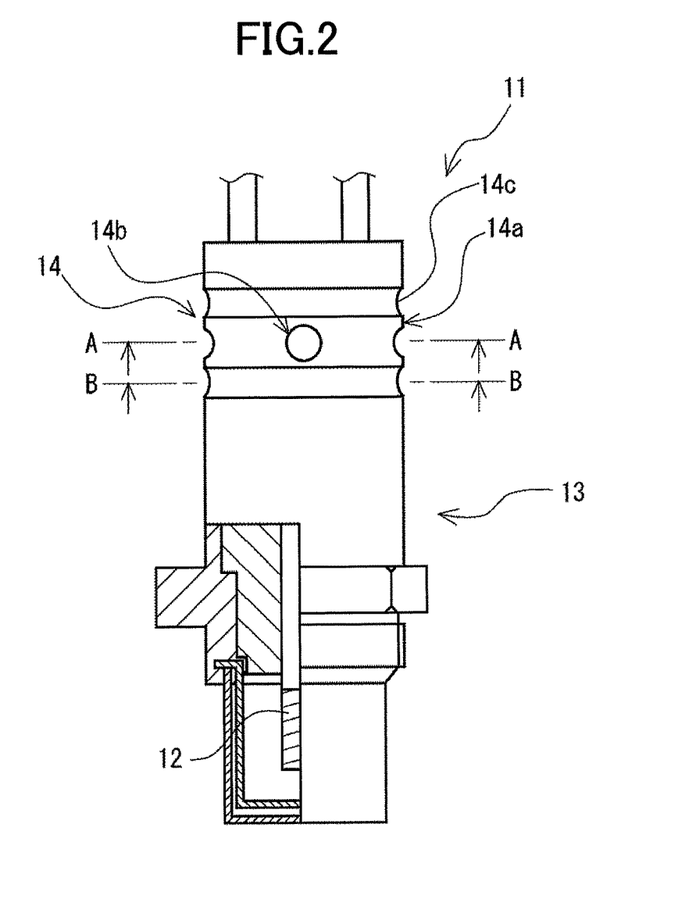
FIG. 2 is a schematic drawing illustrating a gas sensor according to an embodiment of the present disclosures.
Figure 5:
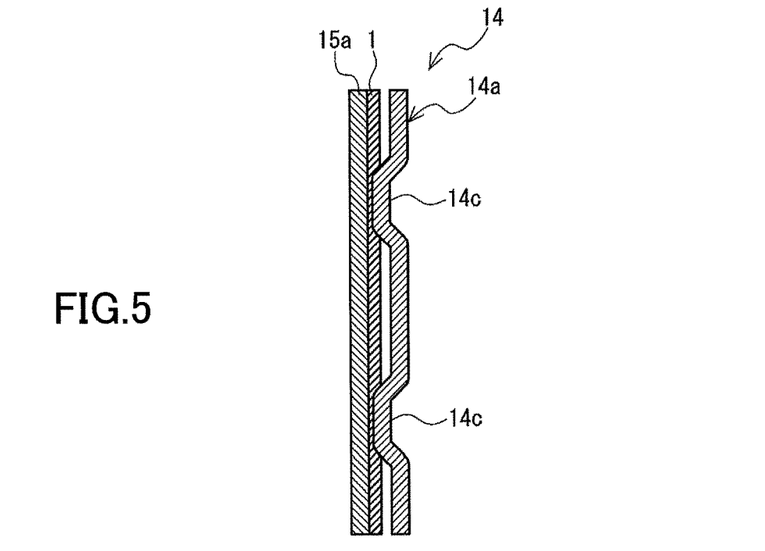
FIG. 5 is an enlarged partial cross-sectional view taken along the axial direction of the gas inlet of the gas sensor illustrated in FIG. 2.

The lower limit of a ratio (thickness ratio) of the thickness of the compressed portion of the oil repellent sheet material 1 pressed by the recess 14c to the thickness of the other portion (i.e., the thickness of the uncompressed portion) is preferably 0.1 and more preferably 0.3. Further, the upper limit of the ratio is preferably 0.8 and more preferably 0.5. Use of the ratio less than the lower limit creates a risk that the oil repellent sheet material 1 breaks at the point of compression. Conversely, use of the ratio greater than the upper limit creates a risk of failing to reliably secure the oil repellent sheet material 1 in a desired position.

Having the oil repellent sheet material 1 made by the method of making an oil repellent sheet material, the gas sensor 11 can provide the gas inlet 14 with an excellent gas permeability, an excellent oil repellent property, and an excellent heat resistance. Owing to having the oil repellent sheet material 1, the gas sensor 11 can reduce the likelihood of lowering of a gas permeability, an oil repellent property, and a water pressure resistance, thereby enabling the sustainment of a high gas permeability, a high oil repellent property, and a high water pressure resistance.

Other Embodiments

The embodiments disclosed herein should be regarded as examples only and as non-limiting in all aspects. The scope of the present invention is defined by the claims without being limited to the configurations of the disclosed embodiments, and is intended to include all modifications within the spirit and equivalents of the scope of the claims.

Use of the oil repellent sheet material is not limited to the gas inlet of a gas sensor. For example, the oil repellent sheet material may be used as a filter for medical applications, or may be used as a different item than an air filter. When the oil repellent sheet material is disposed in the gas inlet of a gas sensor, the specific structure for arranging the oil repellent sheet material is a matter of design choice depending on the structure of a gas sensor. For example, the structure may be such that an oil repellent sheet material having a flat film shape is disposed on one end of the tubular body in the axial direction.

Embodiments

In the following, examples will be used to describe the present invention in more detail. It may be noted, however, that the present invention is not limited to these examples.
<Making of Sample>
[No. 1]

TFE/PDD ("AF2400" manufactured by Mitsui-DuPont Fluorochemical Co., Ltd.) serving as an amorphous fluorine resin was dissolved in perfluoropolyether (Galden (registered trademark) "SV135" manufactured by Solvay Solexis S.p.A) serving as a solvent to prepare a composition for forming an oil repellent layer having a concentration of 0.1 mass %. This composition for forming an oil repellent layer was applied (in the application step) by spray coating to a porous sheet (POREFLON (registered trademark) tube "TB-1412" manufactured by Sumitomo Electric Fine Polymer, Inc.) having a flat film shape with a thickness of 0.9 mm and a fibrous skeleton composed mainly of PTFE. The composition for forming an oil repellent layer was then dried at room temperature (25° C.). The amount of applied amorphous fluorine resin was 10 $\mu g/cm^2$ in terms of solids per unit area of the porous sheet. Subsequently, a thermostatic bath based on the circulation of hot air was used to apply heat treatment to the porous sheet at 320° C. for 10 minutes (in the heat treatment step). After this heat treatment, the porous sheet was disposed between a cylindrical support and a cylindrical metal cover disposed on the outer side of the support, and the opposite ends of the cover in the axial direction were pressed with a die from the outer surface (in the swaging step) to produce an oil repellent sheet material No. 1. The average thickness of the compressed portion of the oil repellent sheet material produced by the swaging process was 0.4 mm. Table 1 shows the mass ratio (mass %) of the amorphous fluorine resin to the porous sheet in the above-noted application step and the thickness (μm) of the oil repellent layer of the obtained oil repellent sheet material. It may be noted that, in this example, the thickness of the oil repellent layer was measured by observing a cross-section of the sheet material with a microscope after dyeing, with an oil-based ink, the portion where the oil repellent layer was not formed.
[No. 2 to No. 5]

Oil repellent sheet materials No. 2 to No. 5 were made in substantially the same manner as in No. 1, except that the amount of an applied amorphous fluorine resin in terms of solids per unit area of a porous sheet was set as in Table 1. Table 1 shows the mass ratio (mass %) of the amorphous fluorine resin to the porous sheet in the above-noted application step and the thickness (μm) of the oil repellent layer of the obtained oil repellent sheet material.
[No. 6]

Substantially the same composition for forming an oil repellent layer as in No. 1 was prepared. A porous sheet substantially the same as in No. 1 was immersed in (dip-coated with) the above-noted composition for forming an oil repellent layer (in the application step), and the composition for forming an oil repellent layer was dried at room temperature (25° C.). The amount of applied amorphous fluorine resin was 200 $\mu g/cm^2$ in terms of solids per unit area of the porous sheet. Subsequently, a thermostatic bath was used to apply heat treatment to the porous sheet at 260° C. for 10 minutes (in the heat treatment step). After this heat treatment, the porous sheet was swaged in substantially the same procedure as in No. 1 (in the swaging step) to produce an oil repellent sheet material No. 6. Table 1 shows the mass ratio (mass %) of the amorphous fluorine resin to the porous sheet in the above-noted application step and the thickness (μm) of the oil repellent layer of the obtained oil repellent sheet material.
[No. 7 to No. 11]

Oil repellent sheet materials No. 7 to No. 11 were made in substantially the same manner as in No. 6, except that the heating temperature for the porous sheet was set in accordance with Table 1. Table 1 shows the mass ratio (mass %) of the amorphous fluorine resin to the porous sheet in the above-noted application step and the thickness (μm) of the oil repellent layer of the obtained oil repellent sheet material.
[No. 12 to No. 16]

Oil repellent sheet materials No. 12 to No. 16 were made in substantially the same manner as in No. 1 to No. 5, except that heat treatment was not applied to the porous sheet.
[No. 17]

An oil repellent sheet material No. 17 was made in substantially the same manner as in No. 6, except that heat treatment was not applied to the porous sheet.
[No. 18]

A resin composition composed of a mixture of PTFE powder (Fluon (registered trademark) CD123E manufactured by AGC Inc.), TFE/PDD ("AF2400" manufactured by Mitsui-DuPont Fluorochemical Co., Ltd.) serving as an amorphous fluorine resin, and heptacosafluorotributylamine serving as a solvent was placed in an monoaxial extruder having a diameter (inner diameter) of 10 mm, and was extruded in a string form from a capillary having a die diameter of 2 mm at a cylinder temperature setting of 50° C. and at an extrusion rate of 60 mm/min, with elongation by a factor of two in the longitudinal direction (extrusion direction) at 270° C., thereby producing a porous sheet having TFE/PDD on the outer surface of a fibrous skeleton composed mainly of PTFE. This porous sheet was swaged in substantially the same procedure as in No. 1 to produce an oil repellent sheet material No. 18. Table 1 shows the mass ratio (mass %) of the amorphous fluorine resin to the porous sheet for No. 18. It may be noted that in No. 18, TFE/PDD was mixed with the PTFE, which made it impossible to measure the thickness of the oil repellent layer made of TFE/PDD.

TABLE 1

| | Application Step | | Heat Treatment Step | | Mass Ratio of Amorphous Fluorine Resin to Porous Sheet [mass %] | Thickness of oil repellent layer [μm] |
|---|---|---|---|---|---|---|
| | Application Method | Application Amount of Amorphous Fluorine Resin | Heating Temperature | Length of Heating | | |
| No. 1 | Spray Coating | 10 | 320 | 10 | 0.016 | 50 |
| No. 2 | Spray Coating | 15 | 320 | 10 | 0.024 | 50 |
| No. 3 | Spray Coating | 40 | 320 | 10 | 0.064 | 60 |
| No. 4 | Spray Coating | 5 | 320 | 10 | 0.008 | 40 |
| No. 5 | Spray Coating | 80 | 320 | 10 | 0.130 | 60 |
| No. 6 | Immersion | 200 | 260 | 10 | 0.300 | 900 |
| No. 7 | Immersion | 200 | 280 | 10 | 0.300 | 900 |
| No. 8 | Immersion | 200 | 300 | 10 | 0.300 | 900 |
| No. 9 | Immersion | 200 | 330 | 10 | 0.300 | 900 |
| No. 10 | Immersion | 200 | 250 | 10 | 0.300 | 900 |
| No. 11 | Immersion | 200 | 340 | 10 | 0.300 | 900 |
| No. 12 | Spray Coating | 10 | — | — | 0.016 | 50 |
| No. 13 | Spray Coating | 15 | — | — | 0.024 | 50 |
| No. 14 | Spray Coating | 40 | — | — | 0.064 | 60 |
| No. 15 | Spray Coating | 5 | — | — | 0.008 | 40 |
| No. 16 | Spray Coating | 80 | — | — | 0.130 | 60 |
| No. 17 | Immersion | 200 | — | — | 0.300 | 900 |
| No. 18 | — | — | — | — | 1.000 | — |

<Evaluated Items>

(Oil Repellent Property Prior to Swaging)

Ethanol was applied to the porous sheets of No. 1 through No. 18 before swaging (before swaging and after heat treatment for No. 1 through No. 11), and was let stand at room temperature (25° C.) for 3 minutes. After this, a visual inspection was performed to determine whether penetration of ethanol had occurred, to evaluate the oil repellent property of the porous sheets in accordance with the following criteria. Table 2 illustrates the results of evaluation.

A: penetration of ethanol did not occur.

B: penetration of ethanol occurred.

(Oil Repellent Property After Swaging)

Ethanol was applied to the porous sheets of No. 1 through No. 18 after swaging, and was let stand at room temperature (25° C.) for 3 minutes. After this, a visual inspection was performed to determine whether penetration of ethanol had occurred, to evaluate the oil repellent property of the porous sheets in accordance with the following criteria. Table 2 illustrates the results of evaluation.

A: penetration of ethanol did not occur.

B: penetration of ethanol occurred.

(Air Permeability)

For the oil repellent sheet materials No. 1 through No. 18, a digital-model Oken-type air permeability tester "EGO1-5-1-MR" manufactured by Asahi Seiko Co., Ltd. conforming to JIS-P8177:2009 was used to measure Gurley seconds, which are obtained as the length of time required for 100 cm$^3$ of air to pass through a sample of 6.45 cm$^2$ with an average pressure difference of 1.22 kPa. Table 2 illustrates the results of measurement.

(Water Pressure Resistance)

For the oil repellent sheet materials No. 1 to No. 18, the water resistance pressure (i.e., the water pressure that causes, upon being applied to one side of the sheet material, water to start leaking from the other side) was measured. Table 2 illustrates the results of measurement.

TABLE 2

| | Oil Repellent Property (Before Swaging) | Oil Repellent Property (After Swaging) | Gurley seconds [s] | Water Pressure Resistance |
|---|---|---|---|---|
| No. 1 | A | A | 105 | 115 |
| No. 2 | A | A | 112 | 128 |
| No. 3 | A | A | 145 | 180 |
| No. 4 | B | B | 102 | 110 |
| No. 5 | A | A | 900 | — |
| No. 6 | A | A | 86 | 97 |
| No. 7 | A | A | 95 | 108 |
| No. 8 | A | A | 109 | 118 |
| No. 9 | A | A | 108 | 122 |
| No. 10 | A | B | 80 | 85 |
| No. 11 | A | A | 600 | — |
| No. 12 | A | B | 103 | 109 |
| No. 13 | A | B | 113 | 125 |
| No. 14 | A | B | 147 | 177 |
| No. 15 | B | B | 95 | 103 |
| No. 16 | A | A | 800 | — |
| No. 17 | A | B | 105 | 120 |
| No. 18 | A | A | 108 | 111 |

The symbol "-" in the "water pressure resistance" in Table 2 means that the clogging of pores prevented measurements from being taken.

<Result of Evaluation>

As shown in Table 1 and Table 2, when heat treatment was performed with respect to a porous sheet having a fibrous skeleton and composed mainly of PTFE, obtained oil repellent sheet materials (No. 1 to No. 3 and No. 6 to No. 9) were capable of maintaining a high gas permeability, a high oil repellent property, and a high water pressure resistance. When no heat treatment was performed (No. 12 to No. 17), no obtained oil repellent sheet materials were capable of maintaining a high gas permeability, a high oil repellent property, and a high water pressure resistance.

Specifically, as shown in the samples No. 1 to No. 3 for which a composition for forming an oil repellent layer having an amorphous fluorine resin dispersed therein was applied by spray coating, and for which the amount of an applied composition for forming an oil repellent layer was 10 μg/cm$^2$ or more and 75 μg/cm$^2$ or less for the created oil repellent layer having a thickness of 40 to 60 μm, and heat treatment was performed at temperature greater than 250° C. and less than 340° C., such an arrangement allows an excellent oil repellent property to be maintained after swaging, and, also, reduces the clogging of pores. As a result, Gurley seconds (air permeability) and water pressure resistance stays at excellent levels. Furthermore, applying a composition for forming an oil repellent layer to a porous sheet by use of spray coating allows a small application amount to provide an oil repellent property, thereby reducing manufacturing cost. As shown in No. 6 to No. 9 for which a composition for forming an oil repellent layer having an amorphous fluorine resin dispersed therein was applied by dip-coating (immersion), and for which heating temperature in the heat treatment step was greater than 250° C. and less than 340° C., such an arrangement reduces the clogging of pores of the porous sheet, thereby maintaining an excellent oil repellent property after swaging while retaining excellent Gurley seconds (air permeability) and water pressure resistance.

DESCRIPTION OF REFERENCE SYMBOLS 1 oil repellent sheet material,
11 gas sensor, 12 sensor device
13 casing, 14 gas inlet, 14a cover
15b, 15b gas admitting holes, 14c recess,
15a tubular body

What is claimed is:

1. A method of making an oil repellent sheet material, comprising:
   a step of applying to a porous sheet a composition for forming an oil repellent layer, the composition containing a solvent and an amorphous fluorine resin dispersed therein; and
   a step of swaging the porous sheet after the step of applying,
   wherein the porous sheet has a fibrous skeleton composed mainly of polytetrafluoroethylene,
   the method of making an oil repellent sheet material further comprising
   a drying step of drying the porous sheet to which the composition for forming an oil repellent layer is applied, before or after the step of swaging, and
   a heat treatment step of melting, after the drying step, the amorphous fluorine resin by heating the porous sheet, to cause the amorphous fluorine resin to adhere to an outer surface of the fibrous skeleton.

2. The method of making an oil repellent sheet material as claimed in claim 1, wherein the heat treatment step is performed before the step of swaging.

3. The method of making an oil repellent sheet material as claimed in claim 2, wherein heating temperature in the heat treatment step is greater than 250° C. and less than 340° C., and a length of heat treatment is greater than or equal to 5 minutes.

4. The method of making an oil repellent sheet material as claimed in claim 3, wherein the heating temperature is greater than or equal to 300° C. and less than or equal to 335° C.

5. The method of making an oil repellent sheet material as claimed in claim 1, wherein in the step of applying, the composition for forming an oil repellent layer is spray-coated.

6. The method of making an oil repellent sheet material as claimed in claim 5, wherein an application amount of the amorphous fluorine resin is greater than or equal to 10 μg/cm$^2$ and less than or equal to 75 μg/cm$^2$ in terms of solids per unit area on a surface plane of the porous sheet.

7. The method of making an oil repellent sheet material as claimed in claim 1, wherein the amorphous fluorine resin is a tetrafluoroethylene-perfluorodioxol copolymer, a tetrafluoroethylene-perfluoromethylvinyl ether copolymer, a tetrafluoroethylene-perfluoroethylvinyl ether copolymer, a tetrafluoroethylene-perfluoropropyl vinyl ether copolymer, a perfluoro (4-vinyloxy-1-butene) cyclized polymer, or combinations thereof.

8. The method of making an oil repellent sheet material as claimed in claim 1, wherein the oil repellent sheet material is an air filter.

* * * * *